United States Patent [19]

Lagadec

[11] Patent Number: 4,709,278
[45] Date of Patent: Nov. 24, 1987

[54] METHOD AND APPARATUS FOR PRODUCING AND SELECTIVELY EQUALIZING A TEMPORAL RELATIONSHIP BETWEEN SERIES OF DIGITAL SIGNALS

[75] Inventor: Roger Lagadec, Rümlang, Switzerland

[73] Assignee: Willi Studer AG, Regensdorf, Switzerland

[21] Appl. No.: 774,006

[22] Filed: Sep. 9, 1985

[30] Foreign Application Priority Data

Sep. 21, 1984 [CH] Switzerland ..................... 04 526/84

[51] Int. Cl.$^4$ ......................... G17B 20/20; G17B 5/02
[52] U.S. Cl. ......................................... 360/26; 360/27
[58] Field of Search ........................ 360/26, 27; 371/1

[56] References Cited

U.S. PATENT DOCUMENTS

3,843,952 10/1974 Husson .................................. 360/26
4,357,702 11/1982 Chese et al. ........................... 360/26
4,485,395 11/1984 Warren ................................. 360/26

Primary Examiner—Vincent P. Canney

[57] ABSTRACT

In order to equalize different delays between the digital signals of two or more digital signal sequences, additional signals are added to at least one of the digital signal sequences of digital signals. The additional signals are indicative of the momentary temporal relationship between the digital signals of the different digital signal sequences.

13 Claims, 7 Drawing Figures

METHOD AND APPARATUS FOR PRODUCING AND SELECTIVELY EQUALIZING A TEMPORAL RELATIONSHIP BETWEEN SERIES OF DIGITAL SIGNALS

CROSS-REFERENCE TO RELATED APPLICATION

This application is related to the commonly assigned, co-pending U.S. application Ser. No. 06/774,005, filed Sept. 9, 1985 and entitled SCANNING FREQUENCY SYNCHRONIZATION METHOD AND APPARATUS

BACKGROUND OF THE INVENTION

The present invention relates to a new and improved method of, and apparatus for, producing and selectively equalizing a temporal relationship between different signal sequences of digital signals.

Digital signal processing stages frequently cause time delays of the signals since such processing stages operate with the inclusion of delay members or units. When, for example, a digital audio signal is read-out from a record carrier, mixed with a further signal in a mixer unit or is otherwise modified, and then is recorded again on the record carrier, the newly recorded signal is temporally offset or shifted relative to the original record. The reason therefor is the conversion of the digital audio signal into an analog signal and vice versa during the use of an analog mixer unit. When a digitally operating mixer unit is used, the reason for the time delay is not the aforementioned conversion but the digital signal processing which is performed in the mixer unit as such.

Heretofore, the temporal or phase alignment of analog audio signals has been intended to be achieved in known manner by using a time code. For this purpose appropriate time code data are recorded on a related independent track of the record carrier. In this manner a number of audio signals can be aligned or placed in phase relative to each other by means of such time code.

Imperfect alignment of two associated audio signals which are recorded on different tracks of a record carrier and which are conjointly listened to, is perceived as an irritation. Such imperfect alignment may be attributed to the aforementioned delays during the digital signal processing. Furthermore, it must be considered that digital audio signals are recorded at a scanning or sampling frequency which is substantially greater than the frequency these two frequencies are not synchronized with respect to each other. One reason therefor is that frequently the scanning or sampling frequency and the time code frequency do not originate from the same clock signal generator. This circumstance has the further consequence that the time code cannot be used, during the processing of the digital audio signals, for the same control functions for which the time code is usually utilized during the processing of analog audio signals. For example, an editing operation can only be imprecisely performed on digital audio signals by means of the time code. Since, furthermore, the digital audio signal and the time code signal usually are not in synchronism, time delays between two parallelly appearing digital audio signals also cannot be indicated relative to a common time code.

SUMMARY OF THE INVENTION

Therefore, with the foregoing in mind it is a primary object of the present invention to provide a new and improved method of, and apparatus for, producing and selectively equalizing a temporal relationship between different signal sequences of digital signals and which can be used to correct for different time delays between the digital signal sequences.

Now in order to implement these and still further objects of the invention, which will become more readily apparent as the description proceeds, the method of the present development is manifested by the features that, a predetermined number of additional signals is generated. The predetermined number of additional signals are added to one of the different signal sequences of digital signals and indicate the momentary temporal relationship between two predetermined digital signals of the different signal sequences of digital signals.

As already alluded to above, the invention is not only concerned with the aforementioned method aspect but also relates to an improved apparatus for producing and selectively equalizing a temporal relationship between different signal sequences of digital signals.

Specifically, the inventive apparatus requires a predetermined number of reproduction channels, each of which is associated with a preselected one of the different signal sequences and contains a synchronization word detector. Deformatting means are operatively associated with each one of the predetermined number of reproduction channels. Time delay control means are provided and are conjointly associated with at least two of the predetermined number of reproduction channels.

It is one essential advantage which is achieved by the invention, that different time delays between a number of digital signal sequences can be detected in a simple manner and also can be equalized. The precise alignment of a number of digital audio signals on a number of tracks of the same record carrier is thereby rendered possible. In the same manner there can also be produced intentional desired time delays of the one digital audio signal relative to a further digital audio signal.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIG. 1b is a schematic illustration of a reference track associated with the format shown in FIG. 1a;

DETAILED DESCRIPTION OF THE PREFERRED EMBODIMENTS

Describing now the drawings, it is to be understood that only enough of the inventive method and apparatus for producing and selectively equalizing a temporal relationship between different signal sequences of digital signals, has been shown as needed for those skilled in the art to readily understand the underlying principles and concepts of the present development, while simplifying the showing of the drawings. In the following, the invention will be explained with reference to the field of processing digital audio signals, however, it will be understood that the use of the inventive method and apparatus is not restricted to processing digital audio signals but can be used with the same favorable effects and advantages in the same manner for processing other types of digital signals.

Figure 1A:
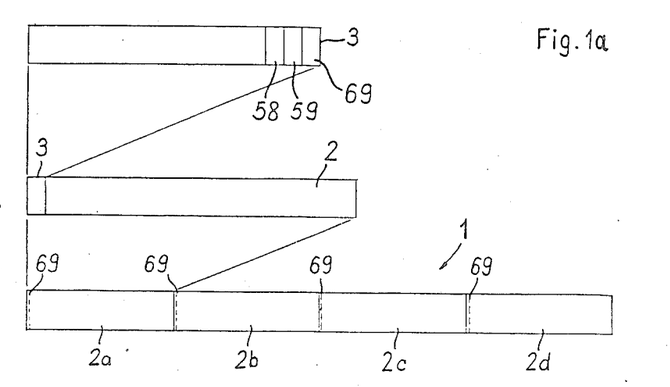
FIG. 1a is a schematic illustration of a format for recording digital audio signals.

FIG. 1a is a schematic representation of a format in which a signal sequence of digital audio signals is arranged for recording. The herein referred-to format is an exemplary format and it will be understood that other appropriate formats can be used for the same purpose. The illustrated format is known in the art under the designation DASH which means Digital Audio Stationary Heads.

In accordance with the illustrated format and as illustrated in FIG. 1a, the digital signals or data are grouped in sectors 1, each of which is composed of four blocks 2a, 2b, 2c and 2d. Each one of the blocks 2a, 2b, 2c and 2d is composed of 18 words and each of the words encompasses 16 bits. 12 words of the 18 words of each block 2a, 2b, 2c and 2d constitute 12 data words, each of which represents one scanned or sampled value or signal of one signal sequence of the digital audio signals. A synchronization word 3 is provided at the start of each one of the blocks 2a, 2b, 2c and 2d. This synchronization word 3 is composed of 16 bits in a manner which is known as such.

Usually a number of parallel tracks are provided on a tape-like record carrier. Each one of the tracks is intended for recording one signal sequence of a number of different signal sequences of digital audio signals which are formatted in the manner as described hereinbefore. In accordance with the aforementioned DASH-format there is also provided on the tape-like record carrier a track for recording a further sequence of digital signals, specifically a reference track 11, see FIG. 1b. Reference words 4 are series-arranged on the reference track 11. Each one of the reference words 4 requires as much space or time on the record carrier as the sector 1 on the other tracks.

Figure 1B:
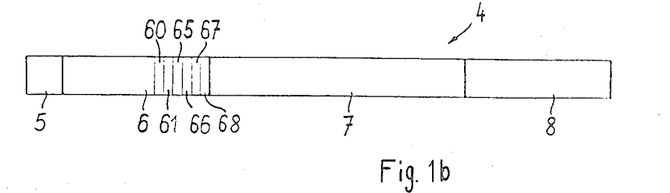

Each reference word 4 encompasses in a manner which is known as such, a synchronization pattern 5, a control word 6, a reference address 7 and a cyclic redundancy check or CRC-word 8. The control word 6 encompasses 16 bits which are not directly comparable to the bits on the other tracks.

Figure 2:
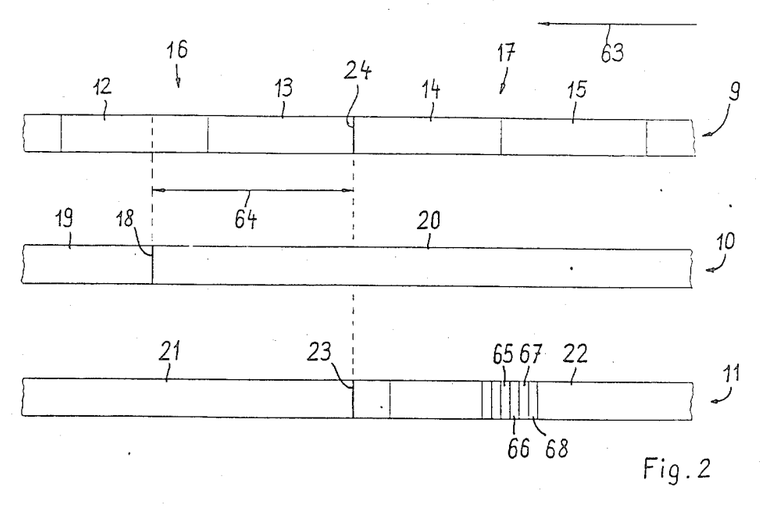
FIG. 2 is a schematic illustration showing different tracks which are present at a record carrier on which the digital audio signals are recorded in the format illustrated in FIGS. 1a and 1b.

The arrangement of the tracks on the tape-like record carrier is shown in FIG. 2. There will be recognized a data track 9, a time code track 10 and a reference track 11. For example, the blocks 12, 13, 14 and 15 can be recognized on the data track 9. In FIG. 2 the blocks 12 and 13 are associated with a first sector 16 and the blocks 14 and 15 are associated with a second sector 17. A time code word boundary 18 can be identified on the time code track 10. In reality such time code word boundary 18 constitutes nothing more than a separating location between two successive time code words 19 and 20. Conventionally, 25, 30 or 29.97 time code words, each of which comprises 80 bits, are recorded per second. Two successive reference words 21 and 22 can be identified on the reference track 11. A separating location 23 between the reference words 21 and 22 coincides in terms of location and time with a separating location 24 between the sectors 16 and 17 on the data track 9.

Figure 3:
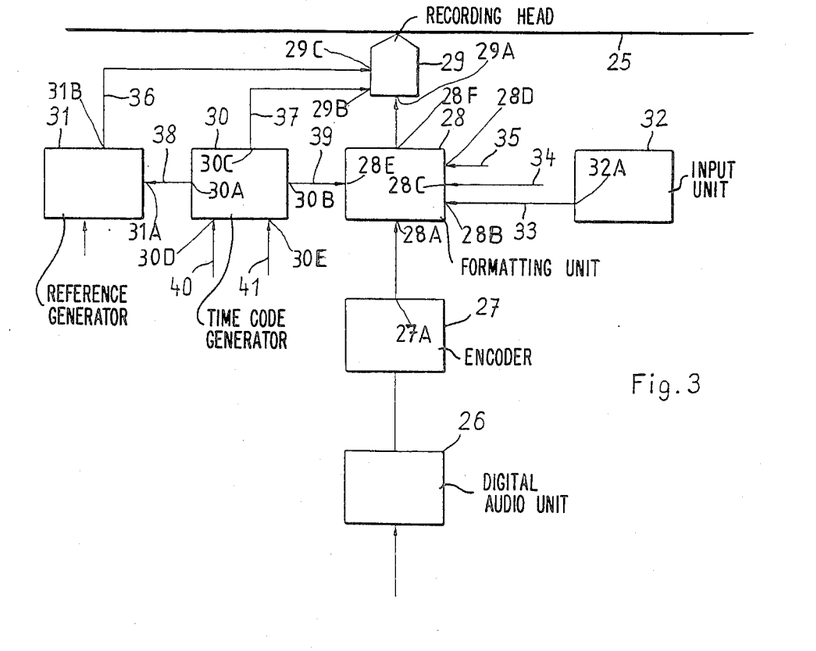
FIG. 3 is a schematic block circuit diagram showing part of an apparatus for recording digital audio signals of the type as shown in FIGS. 1a and 1b or 2 on a tape-like record carrier.

FIG. 3 shows a schematic block circuit diagram of part of an apparatus for recording digital audio signals in accordance with the aforementioned DASH-format on a tape-like record carrier 25. It is known as such in which manner digital audio signals can be obtained from an analog audio signal. This conversion is assumed to be performed by means of a digital audio-electronic unit 26. An encoder 27 is series-connected in known manner with the digital audio-electronic unit 26.

An input 28a of a formatting unit 28 is connected with an output 27A of the encoder 27 and formats the encoded digital audio signals, for example, in accordance with the DASH-format in a manner which is known as such. An output 28F of the formatting unit 28 is connected with an input 29A of a recording head 29 which in the exemplary embodiment under discussion may be constructed, for example, as a head stack. The formatted digital audio signals are received by the recording head 29 from the formatting unit 28 and are recorded on the record carrier 25.

In addition to the formatting unit 28 there are provided a time code generator 30, a reference generator 31 and an input unit 32. The input unit 32 may constitute, for example, a keyboard, a delay measuring unit or any other appropriate device. A conductor or bus 33 interconnects an output 32A of the input unit 32 and an input 28B of the formatting unit 28. The formatting unit 28 contains a further input 28C which is connected with a block address input line 34. A further input 28D of the formatting unit 28 is connected with a clock signal input line 35.

The time code generator 30 has an output 30A which is connected via a line or conductor 38 to an input 31A of the reference generator 31. A second output 30B of the time code generator 30 is connected with a further input 28E of the formatting unit 28 by means of a line or conductor 39. A further line or conductor 37 interconnects a further output 30C of the time code generator 30 with an input 29B of the recording head 29. The time code generator 30 further contains two inputs 30D and 30E which are respectively connected to clock signal input lines 40 and 41. These clock signal input lines 40 and 41 are provided for feeding clock signals from another apparatus of the same kind or from an external clock signal generator to the time code generator 30.

The reference generator 31 has an output 31B which is connected to a further input 29C of the recording head 29 by means of a line or conductor 36.

Figure 4:
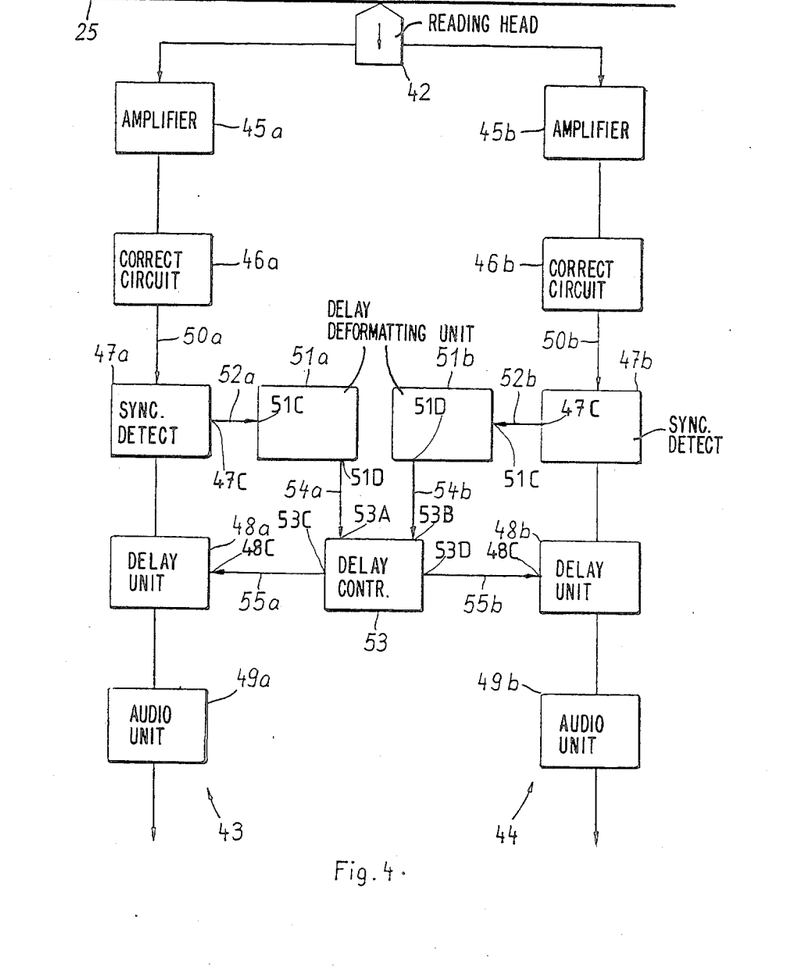
FIG. 4 is a schematic block circuit diagram of part of an exemplary embodiment of the inventive apparatus for reproducing digital audio signals which are recorded on a tape-like record carrier in the manner as illustrated in 1, FIGS. 1a and 1b or 2.

FIG. 4 is a schematic block circuit diagram of part of an exemplary embodiment of the inventive apparatus for reproducing digital signals like, for example, digital audio signals which are recorded on the tape-like record carrier 25. In the illustrated example the record carrier 25 is assumed to contain two data tracks for recorded audio data and which are of the type illustrated as the data track 9 in FIG. 2. The record carrier 25 further comprises the conventional time code track 10 and reference track 11 as illustrated in FIG. 2. A reading head 42 is constructed for this purpose as a head stack and thus is enabled to read all of the tracks on the record carrier 25. Since two data tracks must be read, there are also provided two reproduction channels 43 and 44, each for one of the data tracks on the record carrier 25 or for one of the signal sequences of digital signals recorded on and reproduced from the record carrier 25.

Starting from the reading head 42 the reproduction channels 43 and 44 contain respective series connections of amplifiers 45a and 45b, correction circuits or equalizers 46a and 46b, synchronization detectors 47a and 47b time delay units 48a and 48b as well as conventional audio-electronic units 49a and 49b. The digital audio signals which are read-out from the record carrier 25 are converted into analog audio signals by means of the conventional audio-electronic units 49a and 49b, each of which is associated with one of the reproduction channels 43 and 44. The aforementioned series-connected circuits or components of the reproduction channels 43 and 44 are interconnected by related lines or conductors 50a and 50b.

Related time delay deformatting units or deformatting units 51a and 51b are connected parallel to the synchronization detectors 47a and 47b. For this purpose respective lines or conductors 52a and 52b interconnect outputs 47C of the synchronization detectors 47a and 47b and inputs 51C of the delay deformatting units or deformatting units 51a and 51b.

A time delay control or time delay control means 53 is provided conjointly for the two reproduction channels 43 and 44. An input 53A of the time delay control or time delay control means 53 is connected to an output 51D of the time delay deformatting unit or deformatting unit 51a via a line or conductor 54a. A further input 53B of the time delay control or time delay control means 53 is connected to an output 51D of the time delay deformatting unit or deformatting unit 51b by means of a line or conductor 54b An output 53C of the time delay control or time delay control means 53 is connected to an input 48C of the time delay unit 48a by means of a line or conductor 55a. A further line or delay control or time delay control means 53 and an input 48C of the time delay unit 48b.

The amplifiers 45a and 45b, the correction circuits or equalizers 46a and 46b and the synchronization detectors 47a and 47b which are associated with the reproduction channels 43 and 44, constitute electronic components which are known as such. The same is true for the time delay deformatting units or deformatting units 51a and 51b. These units are merely programmed in such a manner that only a portion of the synchronization words 3 is deformatted thereby in a manner which is known as such.

For the time delay units 48a and 48b there are used known random-access-memories and the storage locations or places of the random-access-memories are controlled by addresses from the time delay control 53.

Figure 5:
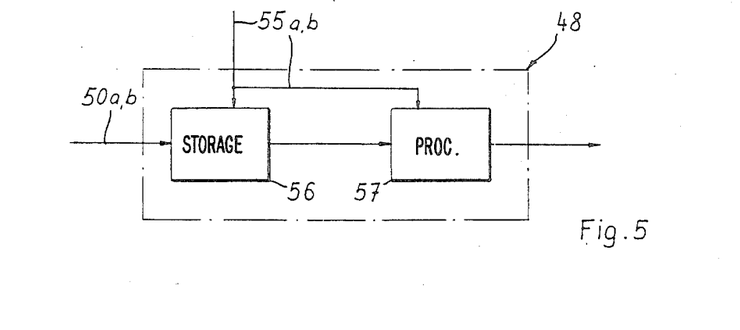
FIG. 5 is a schematic block circuit diagram showing the structure of a time delay unit incorporated in the part of the apparatus illustrated in FIG. 4.

The structure of one of the time delay units 48a and 48b is schematically illustrated as a block circuit diagram in FIG. 5. The time delay unit is accordingly composed of a series-connection of a known storage 56 which constitutes a random-access-memory, and a processor 57. Preferably, the processor 57 is structured as a digital filter.

Figure 6:
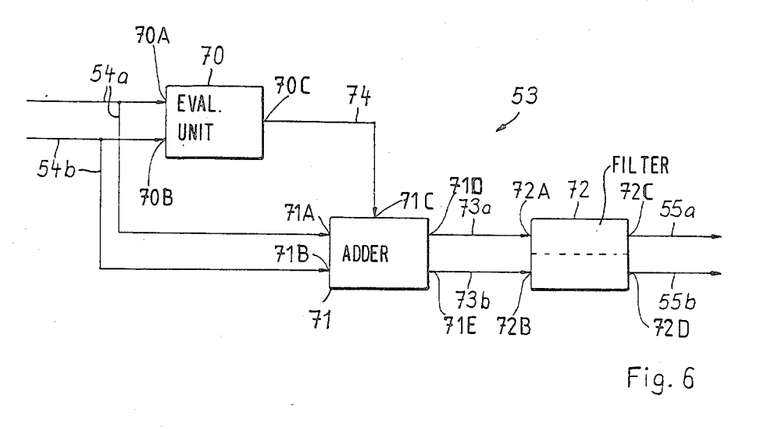
FIG. 6 is a schematic block circuit diagram of a time delay control which is incorporated in the part of the inventive apparatus illustrated in FIG. 4.

FIG. 6 schematically shows an example for a possible construction of the time delay control or time delay control means 53. This time delay control or time delay control means 53 contains an evaluating unit 70, an adding unit 71 and a filter 72. The evaluating unit 70 has two inputs 70A and 70B which are respectively connected to the lines or conductors 54a and 54b which respectively interconnect the inputs 53A and 53B of the time delay control or time delay control means 53 and the outputs 51D of the time delay deformatting units or deformatting units 51a and 51b. An output 70C of the evaluating unit 70 is connected to an input 71C of the adding unit 71 by means of a line or conductor 74. The adding unit 71 has two inputs 71A and 71B, each of which is connected to a related one of the aforementioned lines or conductors 54a and 54b. An output 71D of the adding unit 71 is connected via a line or conductor 73a to an input 72A of the filter 72. A further output 71E of the adding unit 71 is connected by means of a line or conductor 73b to a further input 72B of the filter 72. Outputs 72C and 72D of the filter 72 are respectively connected to the lines or conductors 55a and 55b which, in turn, are respectively connected to the inputs 48C of the time delay units 48a and 48b. In general, the adding unit 71 has one output for each reproduction channel 43 or 44.

A number of possibilities exist to produce a temporal relationship between two different signal sequences of digital signals, for example, a sequence of digital audio signals of the type as appear on the data track 9 of the record carrier 25, and a sequence of digital time code signals as appear on the time code track 10 of such record carrier 25. It is one such possibility to add to the digital audio signals, data or additional signals which indicate a temporal relationship between the digital audio data or signals and the time code. Such data is designated, for example, as time code marking. By such time code marking predetermined locations or positions are marked on a data track 9 to which the time code marking is related.

The aforementioned time code markings or predetermined number of additional signals constitute digital data which, for example, are processed or carried by a digitally operating audio system and which produce a temporal relationship to a further data system which is referred to time such as, for example, a time code. It can be assumed that each digitally operating audio system operates in a format which is composed of words ad blocks of words. Such words and blocks of words may also be grouped in other formats than the aforementioned DASH-format. Almost of necessity these formats have a frequency which, when considered as the frequency of the appearing blocks, is greater than the frequency of the words of a time code. Generally and, for example, with respect to the recording of digital audio data or signals, reference can be made to intervals. In the aforementioned DASH-format one such interval signifies either one block, like the blocks 2a to 2d FIG. 1a or the blocks 12 and 13 as well as 14 and 15 illustrated in FIG. 2 or to the sector 1 illustrated in FIG 1a or the sector 16 or 17 illustrated in FIG. 2. In the also very well known AES/EBU Digital Audio Interface, one interval would be equated with one transmission block.

In the case that only a coarse resolution is required, the time code marking or preselected number of additional signals merely indicates that a distinct interval, for example, the block 12 shown in FIG. 2, coincides with a time code word boundary 18 in terms of time or location. The precision of such a time code marking or preselected number of additional signals thus corresponds to one interval. In the herein specifically discussed and illustrated DASH-format such a time code marking or preselected number of additional signals can be associated with each one of the sectors 1 illustrated in FIG. 1a and of the sectors 16 and 17 illustrated in FIG. 2. Preferably, this is effected in the fourteenth and fifteenth bit of the synchronization word 3 and these bits are designated in FIG. 1a with the reference numerals 58 and 59.

By appropriately combining the two bits, there can be indicated whether a time code marking or preselected number of additional signals appears in the related sector and also the frequency of the time code. For example, the bit combination 00 could indicate that no further time code word 19 or 20 appears in the related sector 1, 16 or 17. The bit combination 01 would indicate that a time code word begins in the related sector and that the frequency of the time code words is 25 Hertz. The bit combination 10 would indicate that a time code word begins and has a frequency of 30 Hertz. The bit combination 11 would indicate that a time code word begins and has a frequency of 29.97 Hertz.

The time code marking or preselected number of additional signals additionally can be written or recorded on the reference track 11. In the presently specifically discussed DASH-format this is effected in the eleventh and twelfth bits of the control word 6 and these bits are designated by the reference characters 60 and 61 in FIG. 1b. In other words, the data of the bits 60 and 61 as well as 58 and 59 indicate whether a time code word boundary 18 has appeared during the time interval which corresponds to the preceding sector 16, see FIG. 2. This consideration is based on the assumption that the record carrier 25 is moved in the direction of the arrow 63 in FIG. 2.

When the time code generator 30, see FIG. 3, starts writing another time code word 20, see FIG. 2, a corresponding signal is transmitted via the line or conductor 38 to the reference word generator 31 and via the line or conductor 39 to the formatting unit 28. By means of this signal the frequency of the time code is also known to the reference word generator 31 and to the formatting unit 28. Thus, the two last mentioned units can occupy the corresponding bits 58, 59 and 60, 61 by means of the just-mentioned signal.

The time code markings or additional signals also may have a finer resolution. For this purpose the time code markings or a further preselected number of additional signals must also indicate the local or temporal space 64 which exists between the start of a time code word 20 and the start of the next-following interval or sector 17 or reference word 22. In the DASH-format this computed or measured space or distance can be entered on the reference track 11 in the thirteenth to sixteenth bit of the control , word 6. These bits are indicated by the reference characters 65, 66, 67 and 68 in FIGS. 1b and 2. If this precision is insufficient, four successive sectors can be used for writing-in one single space or distance value or data. In such case 16 bits are available for storing the distance or space value or data.

For measuring the distance or space 64, for example, a counter is started in the formatting unit 28 when there is received via the interconnecting line or conductor 39 from the time code generator 30 a signal which indicates that the time code generator 30 starts another time code word 20. The counter is driven by clock pulses which are received by the formatting unit 28 via the clock signal input line 35 and the input 28D in a manner which is known as such. If the sector which is formatted just at this time and which may be the sector 16 illustrated in FIG. 2, is terminated, the counter is stopped and the counter level is written-in or entered in the control word 6 of the reference word 22 as the bits 65 to 68.

When the time delay is known between a first signal sequence relative to a second signal sequence, data or a selected additional signal which represents this time delay can be added to the first signal sequence. If these signal sequences are formatted in accordance with the DASH-format, there is available for this purpose, for example, the sixteenth bit 69 of each synchronization word 3 of each block 2a, 2b, 2c and 2d of a sector 1, see FIG. 1a. There are , thus available four bits per each sector for indicating a time delay. Such a time delay, for example, can be written-in or entered by means of the input unit 32. The formatting unit 28, then, distributes the individual bits of data over the successive blocks 2a, 2b, 2c and 2d, starting with the next-following sector. The time delay which is entered in such manner indicates the number of scanning or sampling intervals and fractions of scanning or sampling intervals by which the momentary reproduced digital signals have been time-delayed relative to their original position on the tape by an external signal processing operation.

When now two such signal sequences which are time-delayed with respect to each other, are supplied via the record carrier 25 to the reading head 42 which is connected with two reproduction channels 43 and 44 for the digital audio signals, each signal sequence is at first amplified by the related amplifiers 45a and 45b in a manner which is known as such. The digital signals thus obtained are then corrected by means of the correction circuits or equalizers 46a and 46b as described, for example, in commonly assigned, copending U.S. application No. 683,429, filed Dec. 19, 1984, and entitled "METHOD AND APPARATUS FOR REPRODUCING DIGITIZED SIGNALS", to which reference may be readily had and the disclosure of which is incorporated herein by reference. The synchronization words 3 of the individual blocks 2a to 2d are read in the synchronization detectors 47a and 47b. Each one of the time-delay indicating sixteenth bits of the synchronization words 3 in the reproduction channels 43 and 44 is supplied to the related time delay deformatting units or deformatting units 51a and 51b via the related lines or conductors 52a and 52b. The time delay deformatting units or deformatting units 51a and 51b accumulate the individual bits until a word is formed.

Subsequently these words are supplied to the time delay control or time delay control means 53 via the lines or conductors 54a and 54b. The time delay control or time delay control means 53 utilizes the time-delay related data which are received over the line or conductor 54a, for controlling the time delay unit 48a. Correspondingly, the time delay control or time delay control means 53 utilizes the time-delay related data which are received via the line or conductor 54b for controlling the time delay unit 48b. In this manner there is achieved the result that the sum of the time delays is the same for the signals which are processed in the two reproduction channels 43 and 44. This means that after passage through the time delay units 48a and 48b the signals associated with the two reproduction channels 43 and 44 are aligned relative to each other.

The time delay control or time delay control means 53 thus receives via the lines or conductors 54a and 54b the magnitudes of the time delays experienced by each one of the digital audio signals and which are added to each one of the digital audio signals. The time delay control or time delay control means 53 computes the time delays which each one of the digital audio signals must additionally experience in order that all of the digital audio signals may be aligned again to each other. For this purpose the magnitudes of the time delays are supplied via the lines or conductors 54a and 54b to the evaluating unit 70 shown in FIG. 6. This evaluating unit 70 determines the maximum time delay of the time delay magnitudes which have been entered. The evaluating unit 70 outputs via line or conductor 74 the maximum magnitude or value which is at least as great as the largest detected time delay. In the adding unit 71 the individual magnitudes or values of the time delay are subtracted from this maximum magnitude or value received via the line or conductor 74. The result is transmitted via the lines or conductors 73a and 73b to the digital filter 72. In the case that the magnitudes or values of the time delay rapidly vary in one or both of the two lines or conductors 54a and 54b, these temporal variations are reduced or equalized. This is effected by means of the digital filter 72. Such equalized time delay magnitudes or values are supplied to the time delay units 48a and 48b via the lines or conductors 55a and 55b.

Integral equalized time delays can be realized by means of simple time delay circuits including random-access-memories which are usually employed in digital audio techniques and otherwise. Time delays by fractions of scanning or sampling values can be realized by means of correspondingly programmed digital filters which is also known for some time. For this purpose the equalized time delay magnitudes or values are first supplied to a storage like the storage 56 illustrated in FIG. 5. Such equalized time delay values, for example, may consist of a sixteen bit word. The eight most significant bits (MSB) of such sixteen bit word indicate time delays by integral scanning or sampling values and the eight further or least significant bits (LSB) of the sixteen bit word indicate the fraction of a scanning or sampling value. The most significant bits arrive at the storage 56 via the lines or conductors 55a and 55b, whereas the further or least significant bits directly arrive in the processor 57. The eight most significant bits thus define an input address sequence and an output address sequence for the storage 56. The eight further or least significant bits define the filtering coefficients of the processor or digital filter 57 which are to be used. In this manner the time delay obtained in the time delay units 48a and 48b are controlled.

While there are shown and described present preferred embodiments of the invention, it is to be distinctly understood that the invention is not limited thereto, but may be otherwise variously embodied and practiced within the scope of the following claims. Accordingly,

What I claim is:

1. A method of producing and selectively equalizing a temporal relationship between different signal sequences of digital signals, said method comprising the steps of:

generating a predetermined number of additional signals predicated upon one of the different signal sequences; and adding said predetermined number of additional signals to an other one of said different signal sequences of digital signals; and using said predetermined number of additional signals for indicating the momentary temporal relationship between two predetermined digital signals of said different signal sequences of digital signals.

2. The method as defined in claim 1, further including the step of:

using a selected one of said predetermined number of additional signals for controlling a time delay of at least one of said different signal sequences of digital signals.

3. The method as defined in claim 1, further including the steps of:

generating a further signal sequence; and adding a preselected number of said predetermined number of additional signals also to said further signal sequence.

4. The method as defined in claim 1, further, including the steps of:

generating a further signal sequence;

adding a further preselected number of said predetermined number of additional signals exclusively to said further signal sequence.

5. The method as defined in claim 3, wherein:

said step of adding said preselected number of additional signals includes the step of generating a preselected number of marks constituting said preselected number of said predetermined number of additional signals; and using said preselected number of marks for indicating temporal proximity of said digital signals in said different signal sequences.

6. The method as defined in claim 4, wherein:

said step of using said selected one of said predetermined number of additional signals includes the step of selecting an additional signal which is indicative of the space between adjacent digital signals of said different signal sequences of digital signals.

7. The method as defined in claim 2, further including the steps of:

recording said different signal sequences on a tape-like record carrier;

during said step of recording said different signal sequences on said tape-like carrier, formatting said different signal sequences in blocks in accordance with the DASH-format;

including a synchronizing word in each one of said blocks; and accommodating said predetermined number of additional signals in each said synchronizing word.

8. The method as defined in claim 2, further including the steps of:

selecting as said different signal sequences of digital signals, at least one signal sequence composed of digital audio signals, a signal sequence constituting a digital time code signal, and a signal sequence composed of digital reference signals;

recording said different signal sequences on a tape-like record carrier;

during said step of recording said different signal sequences on said tape-like carrier, formatting said different signal sequences in blocks in accordance with the DASH-format; and said step of using said selected additional signal for controlling said time delay entailing the step of adding said selected additional signals to each block of each one of said digital audio signals, to preselected ones of said predetermined number of additional signals indicative of the momentary temporal relationship between two predetermined digital signals of said different signal sequences of digital signals, and to said digital reference signals.

9. An apparatus for producing and selectively equalizing a temporal relationship between different signal sequences of digital signals, said apparatus comprising:
- a predetermined number of reproduction channels each of which is associated with a preselected one of said different signal sequences;
- each said reproduction channel containing a synchronization word detector;
- deformatting means operatively associated with each one of said predetermined number of reproduction channels; and
- time delay control means conjointly associated with at least two of said predetermined number of reproduction channels.

10. The apparatus as defined in claim 9, wherein:
said time delay control means comprise a storage and a processor operatively associated with said storage.

11. The apparatus as defined in claim 10, wherein:
said processor constitutes a digital filter.

12. A method of equalizing a temporal relationship between different signal sequences of digital signals, said method comprising the steps of:
- generating additional signals predicated upon a first one of the different signal sequences of digital signals;
- combining said additional signals with a second one of the different signal sequences of digital signals;
- determining a momentary temporal relationship between said first and second signal sequences of digital signals from said additional signals combined with said second signal sequence; and
- utilizing said determined momentary temporal relationship for establishing a predetermined relationship between at least two predeterminate ones of said different signal sequences.

13. A method of equalizing a temporal relationship between different signal sequences of digital signals, said method comprising the steps of:
- generating additional signals predicated upon a first one of the different signal sequences of digital signals;
- combining said additional signals with a second one of the different signal sequences of digital signals; and
- determining a momentary temporal relationship between said first and second signal sequences of digital signals from said additional signals combined with said second signal sequence.

* * * * *

UNITED STATES PATENT AND TRADEMARK OFFICE
CERTIFICATE OF CORRECTION

PATENT NO. : 4,709,278

DATED : November 24, 1987

INVENTOR(S) : ROGER LAGADEC

It is certified that error appears in the above-identified patent and that said Letters Patent is hereby corrected as shown below:

Column 1, line 49, after "frequency" please insert --at which a time code is digitally recorded. In most cases--

Column 3, line 54, after "1b" please add --and 2--

Column 5, line 47, after "or" (second occurrence) please insert -- conductor 55b interconnects a further output 53D of the time--

Column 6, line 50, after "words" please replace "ad" by --and--

Column 12, line 14, after "predetermined" please insert --time--

Signed and Sealed this

Thirty-first Day of May, 1988

*Attest:*

DONALD J. QUIGG

*Attesting Officer*      *Commissioner of Patents and Trademarks*